United States Patent [19]

Meixner

[11] Patent Number: 4,762,190
[45] Date of Patent: Aug. 9, 1988

[54] WEIGHING APPARATUS INCLUDING WIND SHIELDING MEANS

[75] Inventor: Erwin Meixner, Volketswil, Switzerland

[73] Assignee: Mettler Instrumente AG, Greifensee, Switzerland

[21] Appl. No.: 93,555

[22] Filed: Sep. 8, 1987

[30] Foreign Application Priority Data

Dec. 15, 1986 [CH] Switzerland .......................... 4984/86

[51] Int. Cl.⁴ ............................................. G01G 23/18
[52] U.S. Cl. .................................................. 177/181
[58] Field of Search .................................. 177/180–182

[56] References Cited

U.S. PATENT DOCUMENTS

D. 196,674 10/1963 Rapp et al. .
2,732,199 1/1956 Meinig ................................. 177/181

*Primary Examiner*—George H. Miller, Jr.
*Attorney, Agent, or Firm*—Laubscher and Laubscher

[57] ABSTRACT

A weighing apparatus is provided with a wind shielding arrangement for protectively enclosing a load-receiving scale member. A plurality of symmetrical curvilinear concave transparent shell-like wind shield sections of unequal diameters of generation are concentrically mounted on the scale housing above the load-receiving pan for relative rotational movement about a common axis between a closed protective condition, and an open condition affording access to the scale pan. In one embodiment, a pair of shield sections have generally coplanar edge portions mounted in a pair of concentric circular grooves, respectively, contained in a support on the upper surface of the housing adjacent the load receiving member. The inner shield section is retained in its associated groove by a resilient annular retainer ring that extends radially outwardly above a radially inwardly extending lip portion on the lower edge of the inner shield section.

9 Claims, 2 Drawing Sheets

WEIGHING APPARATUS INCLUDING WIND SHIELDING MEANS

STATEMENT OF THE INVENTION

This invention relates to a weighing instrument including wind shield or screen means for protectively enclosing the scale load-receiving means. The wind shield means includes a plurality of curvilinear transparent sections of different diameters of generation that are relatively rotatably displaceable about a given axis between an open condition affording access to the load-receiving means, and a closed condition protectively enclosing the load-receiving means. The transparent shield sections are formed of glass or suitable synthetic plastic material.

BRIEF DESCRIPTION OF THE PRIOR ART

In high-resolution electronic scales, the weighing accuracy is often impaired by ambient air movement. To prevent these deleterious influencing factors, the weighing pans of high-resolution scales are usually arranged in a weighing chambers whose interior space is accessible from the outside through sliding doors or similar means. Laboratory scales generally include cubical weighing chambers made of glass.

For scales—such as are used, for example, in the jewelry industry—a wind shield or screen is known which has the shape of an upright cylinder whose upper front surface together with a part of the cylinder can be pivoted outwardly around a perpendicular axis located in the generated surface. The weighing material resting on the weighing pan— for example, a precious stone—can be observed during the weighing process and is easily accessible by pivoting the wind screen to the open condition.

This known wind screen possesses the disadvantage that, when in the open condition, it protrudes laterally outwardly beyond the scale and can thus be easily damaged or the scale can be bumped. Furthermore, the known wind screen is not aesthetically pleasing during the presentation of the stone that is being weighed in the presence of the buyer.

OBJECT OF THE INVENTION

A primary object of the present invention is to provide wind or ambient air shield or screen means for weighing apparatus, wherein the weighing pan or dish is continuously observable from any direction and which, when in the open condition, will not protrude over the scale.

According to a more specific object of the invention, the shield means includes a plurality of curvilinear symmetrical concentrically-arranged shell-like sections having different diameters of generation (D1, D2), respectively.

The two mutually engaging concentrically-arranged shield sections, which are formed completely of transparent material, permit unrestricted view of, and complete accessability in any direction to, the weighing pan and the weighing material resting on top of it.

BRIEF DESCRIPTION OF THE DRAWINGS

Other objects and advantages of the invention will become apparent from a study of the following specification, when viewed in the light of the accompanying drawing, in which.

DETAILED DESCRIPTION

Figure 1:
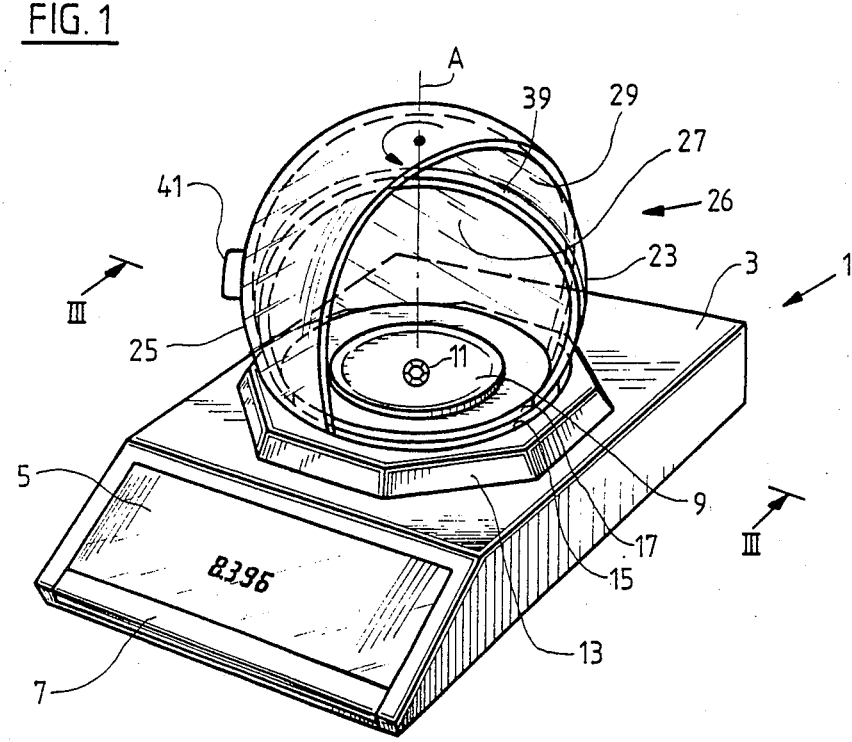
FIG. 1 is a perspective view of a first embodiment of the invention with the wind shielding means in the open condition.
Figure 3:
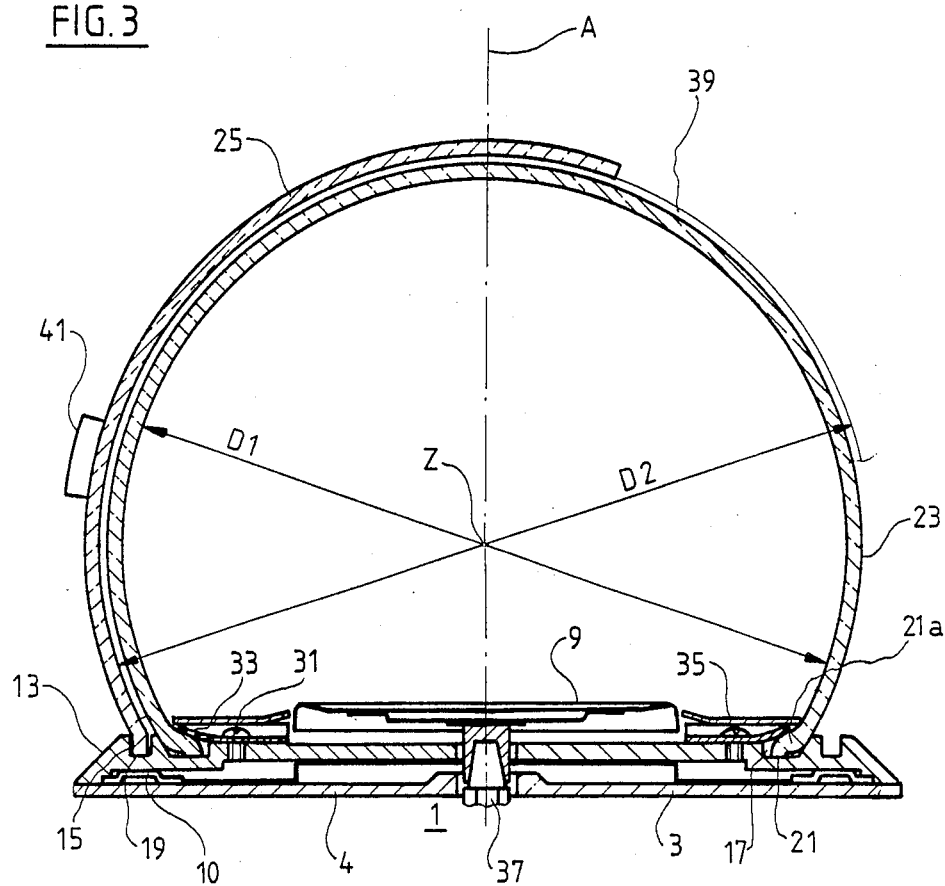
FIG. 3 is a sectional view taken along line III—III of FIG. 1.

Referring first more particularly to FIGS. 1 and 3, the weighing apparatus 1 includes a generally rectangular housing 3 which contains the electronic weighing and indicating circuitry (not shown), together with the display means 5 and the operating key 7. The weighing apparatus 1 is not the object of the present invention and for this reason will not be explained in any greater detail.

Above the cover portion 4 of the scale there is visible the weighing pan or dish—which protrudes upwardly beyond the housing 3—for receiving a precious stone 11 placed thereon.

Figure 2:
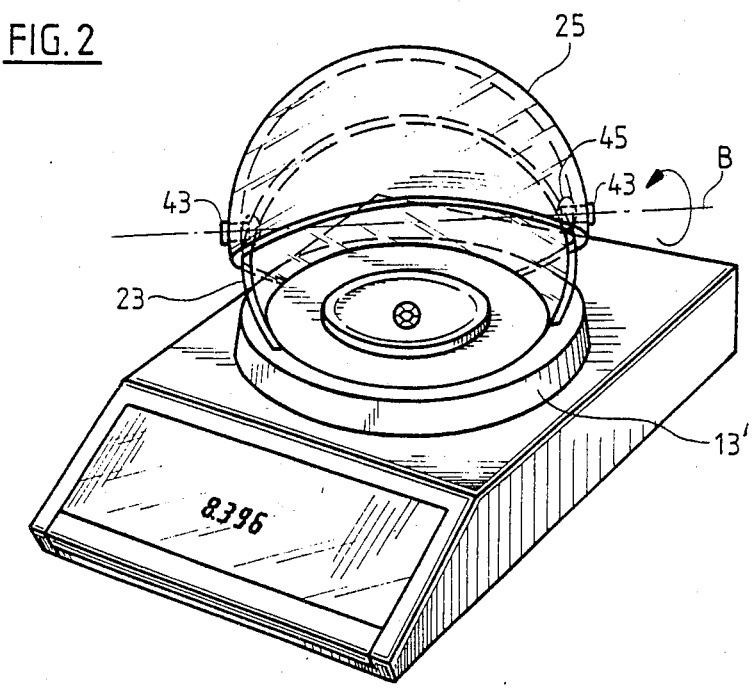
FIG. 2 is a perspective view of another embodiment of the invention.

Weighing pan 9 is surrounded by a foundation or support member 13 which for example, is removably connected with the cover 4 by means of a bayonet catch 10. Foundation member 13 is annular, and its upper surface contains two concentrically arranged circular grooves 15 and 17. In the embodiment of FIG. 1, the foundation includes several corners, or, as shown in FIG. 2, it can have a smooth frusto-conical surface.

The two circular grooves 15 and 17 receive the edges 19 and 21, respectively, of a pair of concentrically arranged generally-spherical curvilinear sections 23 and 25 of the wind screen or shielding means 26. The shield sections 23 and 25 are formed of glass or synthetic plastic material, and contain arcuate openings 27 and 29 generated essentially by planar cuts respectively. The openings 27 and 29 essentially run parallel to axis A, specifically, in such a manner that, in case of a mirror-image arrangement of the two openings 27 and 29 or shield sections 23, 25, there will be an overlapping of both sections.

Referring to FIG. 3, it is seen that the edge portion 19 of the external section 25 extends within groove 15. The edge or inner lip portion 21a of the inner section 23, which is guided in groove 17, extends inwardly toward the center of spherical generation Z. An annular retaining ring 31—which is attached to foundation portion 13 and the periphery of which contains radially inwardly directed recesses or slits 33 for the purpose of increasing the resiliency—presses downwardly upon the lip portion 21a of the shield part 23 and holds the latter in the groove 17.

The weighing pan 9, which is arranged in the center of foundation 13, is placed in a known manner upon the load receiver 37 of the weighing mechanism and is freely vertically movable. Above the ring 31 is arranged an annular cover 35 which surrounds the weighing pan 9 and which prevents any tiny precious stones, which may have been dropped, from entering either of the grooves 15, 17.

The two shield sections 23 and 25 have different diameters D1 and D2 which are so dimensioned that the outer section 25 concentrically receives the inner section 23. A cloth ribbon 39 or a similar sealing means, attached along the opening 27 on the inner section 23, facilitates dust-proof and air-tight sealing of the weighing chamber when the two openings 27, 29 are directed toward each other. To rotate the outer section 25, a handle 41 is provided. To load the scale 1, the outer shield section 25 is rotated until it at least partly surrounds the inner section 23 and the weighing dish 9 becomes accessible from the outside through the aligned section openings 27 and 29. During the weighing operation, the two shield sections 23 and 25 are rotated relative to each other to a condition in which the weighing chamber is completely enclosed.

To make the scale loading opening accessible for either right-handed or left-handed persons in an optimum fashion, the inner section 23 can also be rotated accordingly so that the weighing dish 9 will be accessible from the desired side.

The two shield sections 23, 25 and the openings 27, 29 are so dimensioned that they can be laterally displaced relative to each other or that they can be separated for cleaning only when they are in a predetermined relative position; but if they are rotated against each other, the sections 23, 25 can no longer be separated from each other. In this way, only one of the two sections 23, 25 need be fastened to the foundation 13 the non-fastened section being retained on the foundation by the fastened section. The locking of sections 23, 25, takes place, of course, only if the center Z lies inside the space formed by the surfaces of the spheres and the sectional planes.

In place of spherical sections 23, 25, one can, of course, also use sections of different symmetrical configurations, such as, for example, cylindrical mantles with flat or arched bottoms or the like.

In the embodiment of the invention illustrated in FIG. 2, the rotational axis B—around which the outer shield part 25 can be pivoted—is arranged horizontally. For use as pivot bearings, a pair of pins 43 are provided which are either attached to the outer section 25 or to the inner section 23, and each of which engages a borehole 45 which is correspondingly arranged for this purpose on the other shield part. The fastening of the inner section 23 can, as illustrated in FIG. 3, be accomplished in order here likewise to create a possibility for moving the access opening to the weighing pan 9 into the desired position.

To place the weighing material 11 on the weighing pan 9, the outer section 25 is swung to the rear around the horizontal pivot axis B.

What is claimed is:

1. Protective wind shield means for an electronic weighing apparatus (1) including a housing (3) and a load-receiving member (9) movable relative to the housing, comprising:

(a) a plurality of concentrically-arranged symmetrical generally semispherical transparent shield sections (25,23) having different diameters of generation (D1, D2), respectively; and
   (b) means connecting said sections with the housing to define a protective chamber above the load receiving member, at least one of said sections being connected for movement between open and closed positions relative to the other section, thereby to permit loading and unloading of the load-receiving member.

2. Apparatus as defined in claim 1, wherein the shield sections include generally parallel planar edge portions (19, 21) arranged adjacent the upper surface of the housing in concentrically spaced relation about the load-receiving member.

3. Apparatus as defined in claim 2, and further including an annular support member (13) mounted on the housing concentrically about the load-receiving member, said support member containing a pair of concentrically arranged circular grooves (15, 17) receiving said section edge portions, respectively.

4. Apparatus as defined in claim 3, wherein at least one of said sections is connected for rotation about a vertical axis (A).

5. Apparatus as defined in claim 4, wherein another of said sections is also connected for rotation about said vertical axis.

6. Apparatus as defined in claim 5, wherein the planar edge portion (21) of the innermost shield section (23) has a radially inwardly extending lip portion (21a) and further including a resilient annular generally disk-shaped retaining member (31) connected with said support member and arranged to extend over said lip portion, thereby to retain said edge portion within the corresponding groove.

7. Apparatus as defined in claim 6, wherein said retainer member contains a plurality of slits (33) that extend radially inwardly from the outer periphery of said retainer member.

8. Apparatus as defined in claim 1, wherein a pair of said shield sections are provided, and further including means connecting the outer shield section with the inner shield section for pivotal movement about a horizontal pivot axis.

9. Apparatus as defined in claim 8, wherein said pivotal connecting means comprise a pair of diametrically arranged pins (43).

* * * * *